(12) United States Patent
Vijayan et al.

(10) Patent No.: US 11,507,600 B2
(45) Date of Patent: Nov. 22, 2022

(54) DEPENDENCY AWARE PARALLEL SPLITTING OF OPERATIONS

(71) Applicant: NetApp Inc., Sunnyvale, CA (US)

(72) Inventors: Anoop Chakkalakkal Vijayan, Bangalore (IN); Shrey Sengar, Jharkhand (IN); Krishna Murthy Chandraiah setty Narasingarayanapeta, Bangalore (IN); Akhil Kaushik, Bangalore (IN)

(73) Assignee: NetApp Inc., San Jose, CA (US)

( * ) Notice: Subject to any disclaimer, the term of this patent is extended or adjusted under 35 U.S.C. 154(b) by 379 days.

(21) Appl. No.: 16/686,686

(22) Filed: Nov. 18, 2019

(65) Prior Publication Data
US 2020/0372046 A1 Nov. 26, 2020

(30) Foreign Application Priority Data
May 20, 2019 (IN) .............................. 201941019959

(51) Int. Cl.
*G06F 16/27* (2019.01)
*G06F 16/182* (2019.01)

(52) U.S. Cl.
CPC .......... *G06F 16/275* (2019.01); *G06F 16/184* (2019.01); *G06F 16/27* (2019.01)

(58) Field of Classification Search
CPC ...... G06F 16/27; G06F 16/122; G06F 16/184; G06F 16/215; G06F 16/273; G06F 16/275; G06F 16/278; G06F 11/1458; G06F 11/1461; G06F 3/065
See application file for complete search history.

(56) References Cited

U.S. PATENT DOCUMENTS

| 11,086,105 B2* | 8/2021 | Chang ................ G02B 13/0045 |
| 11,157,455 B2* | 10/2021 | Narasingarayanapeta ................... G06F 16/176 |
| 2014/0222878 A1* | 8/2014 | Avati ...................... G06F 11/30 707/827 |
| 2019/0311049 A1* | 10/2019 | Bhargava .............. G06F 16/178 |

\* cited by examiner

*Primary Examiner* — Marcin R Filipczyk
(74) *Attorney, Agent, or Firm* — Cooper Legal Group, LLC

(57) ABSTRACT

Techniques are provided for dependency aware parallel splitting of operations. For example, a count of pending data operations being executed by a first node and replicated in parallel to a second node are tracked. A metadata operation is executed at the first node based upon the count being less than a threshold (e.g., the count being zero). A first list of affected inodes modified by the metadata operation is identified. A dependency of the metadata operation with respect to pending metadata operations replicated to the second node is determined. The metadata operation is dispatched to the second node based upon the dependency indicating that the metadata operation is independent of the pending metadata operations.

20 Claims, 17 Drawing Sheets

DEPENDENCY AWARE PARALLEL SPLITTING OF OPERATIONS

RELATED APPLICATIONS

This application claims priority to India Provisional Patent Application, titled "DEPENDENCY AWARE PARALLEL SPLITTING OF OPERATIONS", filed on May 20, 2019 and accorded Indian Application No.: 201941019959, which is incorporated herein by reference.

BACKGROUND

A computing environment may implement data replication and/or other redundancy data access techniques for data loss protection and non-disruptive client access. For example, a first node (e.g., a computing device, a virtual machine, a storage virtual machine, a storage system, a software as a service, etc.) may be configured to provide clients with access to data stored within a first storage device and/or other storage devices. A second node may be configured as a backup for the first node in the event the first node fails. Data may be replicated from the first node to the second node. In this way, the second node can provide clients with access to replicated data in the event the first node fails.

One type of replication is asynchronous replication. When the first node receives an operation from a client device, the first node transmits a replication of the operation to the second node for execution. Irrespective of whether the second node has executed the replicated operation, the first node will transmit an acknowledgment of successful performance of the operation to the client device once the first node has executed the operation.

Another type of replication is synchronous replication, which provides a greater level of data protection guarantees, such as a zero recovery point objective (RPO). This is because the first node does not transmit the acknowledgment until the operation has been executed by the first node and the replicated operation has been executed or acknowledged by the second node. In this way, two copies of data and/or metadata resulting from the operation are maintained before the client receives acknowledgment that the operation was successful.

SUMMARY

In some embodiments, a count of pending data operations being executed by a first node and replicated to a second node based upon a synchronous replication relationship where data operations are dispatched in parallel to the first node and the second node is tracked. A metadata operation is executed at the first node based upon the count being equal to zero. A first list of affected inodes modified by the metadata operation are identified. A dependency of the metadata operation with respect to pending metadata operations replicated to the second node is determined based upon whether an inode occurs within both the first list of affected inodes and a second list of affected inodes that are modified by the pending metadata operations. The metadata operation is dispatched to the second node based upon the dependency indicating that the metadata operation is independent of the pending metadata operations.

DETAILED DESCRIPTION

Figure 1:
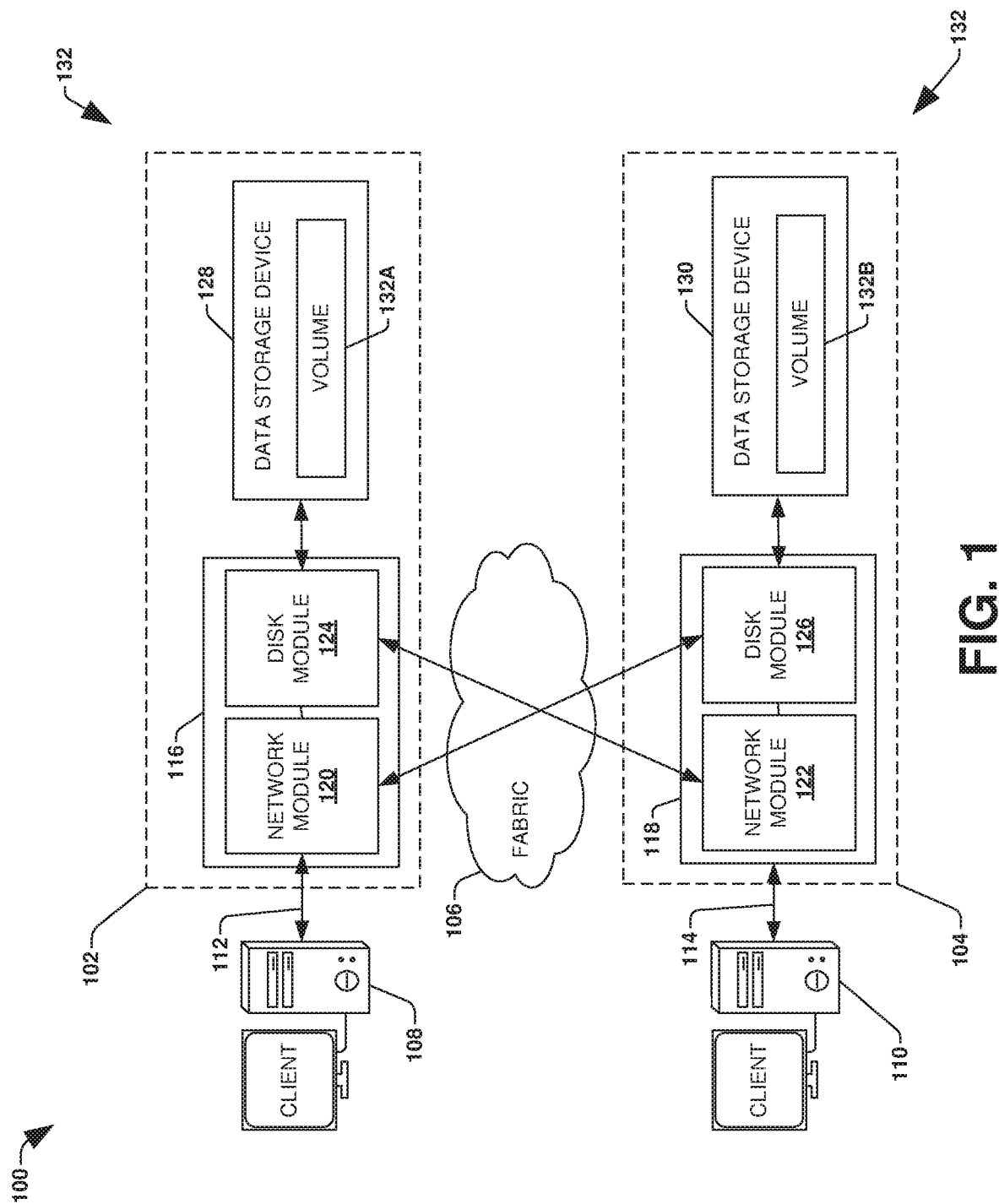
FIG. 1 is a component block diagram illustrating an example clustered network in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A computing environment may implement synchronous replication between a first node and a second node based upon a synchronous replication relationship. For example, an operation (e.g., a data operation, such as a write operation) targeting the first node is executed by the first node and replicated in parallel to the second node for execution. An acknowledgment that the operation is complete is not returned until the operation has been executed by both the first node and the second node. Synchronous replication may be implemented for certain types of data operations and/or metadata operations. Such data operations may comprise a write operation, a punch hole operation, a subfile-sisclone operation, etc. Such metadata operations may comprise a create operation, a link operation, an unlink operation, a rename operation, a set attribute operation, an open operation, a close operation, etc. Data operations can be processed in parallel amongst the first node and the second node if there are no metadata operations executing at the first node and if an inode (e.g., an inode number) specified by a payload of a data operation is not in common with affected inodes (e.g., inode numbers) of pending metadata operations dispatched to the second node.

If the synchronous replication relation becomes out of sync between a storage object of the first node and a replicated storage object of the second node or is initially in a non-synchronous state, then a resynchronization process may be executed to transition from an out of sync state to an in sync state. The transition (resynchronization) can be performed without holding client I/O (e.g., without pausing, blocking, failing, or queueing for later execution), which reduces client latency that would otherwise be experienced if the client I/O was held during the transition.

A dirty region log is used to track regions within the storage object that are modified by data operations, such as write operations executed during a last asynchronous incremental transfer (e.g., asynchronous incremental transfers may be initially performed to incrementally transfer data from the storage object to the replicated storage object to help make the replicated storage object comprise more of the same data as the storage object). The dirty region log may comprise bits that can be set to either a dirty indicator or a clean indicator. A bit may be mapped to a region within the storage object. Thus, the bit can be set to the dirty indicator to indicate that a data operation has modified the region (e.g., the region now comprises data not yet replicated to the replicated storage object). The bit can be set to the clean indicator to indicate that the region is now clean (e.g., the region has not been modified with data not yet replicated to the replicated storage object, and thus the region comprises the same data as a corresponding region within the replicated storage object).

A metadata log is used to track metadata operations that modify the storage object, such as a create operation (e.g., a create file operation, a create LUN operation, etc.), a link operation, an unlink operation, a rename operation (e.g., a file rename operation, etc.), a set attribute operation (e.g., a set volume size operation, an assign permissions operation, etc.), etc. In particular, copies of metadata operations executed upon the storage object during the last asynchronous transfer are inserted into the metadata log.

The metadata operations within the metadata log are replicated to the replicated storage object according to an order that the metadata operations were executed upon the storage object in order to maintain consistency. In particular, the metadata operations are assigned sequence numbers based upon the order that the metadata operations were executed upon the storage object by the first node. The metadata operations are inserted into the metadata log with the sequence numbers. In an embodiment, the metadata operations are sorted within the metadata log based upon the sequence numbers or are inserted into the metadata log based upon the sequence numbers. Unfortunately, sequentially dispatching metadata operations to the second node increases the time to perform the transition.

After the metadata operations are replicated to the second node for execution upon the replicated storage object according to the sequence numbers, the dirty regions identified by the dirty region log are replicated from the storage object to the replicated storage object. That is, the data within the dirty regions (e.g., "dirty" data not yet replicated to the replicated storage object) is transmitted to the second node for storage into corresponding regions within the replicated storage object. The replication of the dirty region is triggered based upon completion of the replication of the metadata operations.

In an embodiment, dirty region logs are created as incore dirty region logs (e.g., maintained in memory) for each storage object of a consistency group, such as for each file of the consistency group. Also, incore splitter objects (e.g., functionality configured to intercept and replicate operations) are setup for each replication endpoint (e.g., the replicated storage object hosted by the second node) and are set to a dirty region logging state. This ensures that incoming client writes are intercepted by the splitter objects, and for each region that is modified by the incoming client writes, dirty bits are set in the dirty region log. Thus, regions that are dirty are captured incore from this point forward. During the cutover phase, the splitter objects are changed to a cut over split state. From this point forward, for every incoming client I/O, a corresponding dirty region log for a target storage object is evaluated. If a write operation targets a dirty region of a storage object, then the write is executed upon the storage object. If a write operation targets a non-dirty or partially dirty region, then data of the write operation is written to the storage object and is split/replicated to a replicated storage object. A cutover scanner may be executed to read the incore dirty region logs. For every dirty region identified, dirty data is replicated to the replicated storage object. During the replication, a lock can be obtained for the dirty region so that any writes to the dirty region are blocked. The lock is removed once the second node writes the replicated dirty data to the replicated storage object.

During parallel splitting of data operations and/or the transition to the synchronous replication state, metadata operations are sequentially replicated to the second node in order to preserve dependencies amongst the metadata operations. This is done to avoid creating inconsistencies between the storage object and the replicated storage object. In an example of an inconsistency, a first metadata operation may be executed at the first node. Inodes affected by the first metadata operation are not known until after the first metadata operation has executed. The first metadata operation may be transmitted to the second node for execution. A second metadata operation may also be executed at the first node. Inodes affected by the second metadata operation are not known until after the second metadata operation has executed. The second metadata operation may be transmitted to the second node for execution. If the second metadata operation ends up being executed before the first metadata operation at the second node (but the first metadata operation was executed first at the first node), then an inconsistency will arise if the first metadata operation and the second metadata operation both affected the same inode. Thus, the metadata operations are sequentially sent to the second node. Unfortunately, this increases replication latency, and thus the time taken to transition to a synchronous mode of replication.

Accordingly, as provided herein, dependencies amongst metadata operations are identified so that independent metadata operations (e.g., metadata operations that do not affect any of the same inodes as one another) can be transmitted to the second node in parallel (e.g., a metadata operation can be transmitted to the second node before receiving acknowledgements that the other pending metadata operations have completed). Dependent metadata operations are executed sequentially with respect to one another in order to avoid any inconsistencies from out of order execution since the dependent metadata operations affect overlapping inodes.

To provide for dependency aware parallel splitting of operations, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, In an embodiment a clustered network can be distributed over a plurality of storage systems and/or nodes located in a plurality of geographic locations; while In an embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and disk modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the disk module 126 of node 118.

Disk modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, disk modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In an embodiment, the host devices 108, 110 can exchange information with the network modules 120, 122 residing in the nodes 116, 118 (e.g., network hosts) in the data storage systems 102, 104.

In an embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In an embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the disk module 126, thereby accessing volume 132B associated with the data storage device 130.

It may be appreciated that dependency aware parallel splitting of operations may be implemented within the clustered network environment 100. It may be appreciated that dependency aware parallel splitting of operations may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
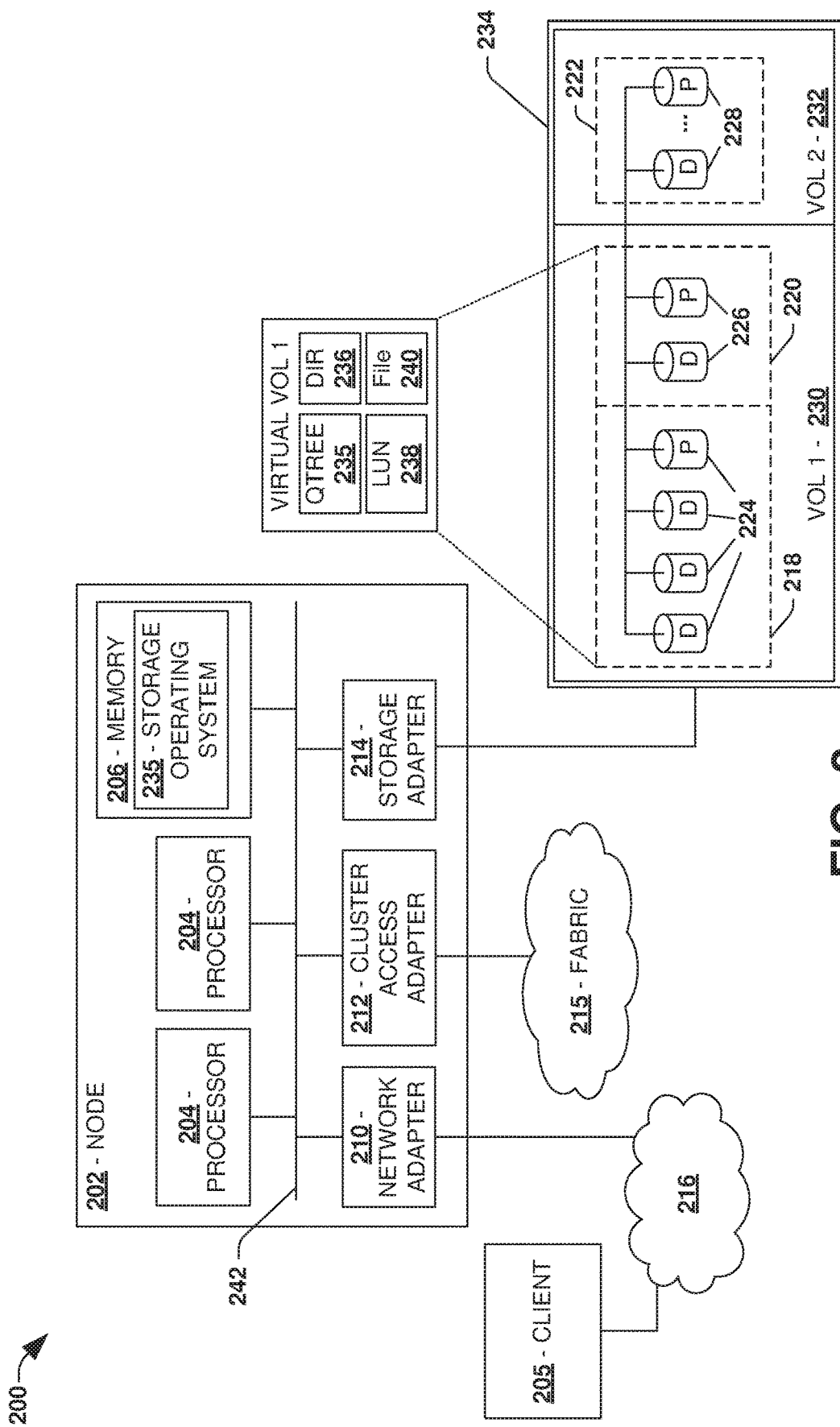
FIG. 2 is a component block diagram illustrating an example data storage system in which an embodiment of the invention may be implemented.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In an embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In an embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In an embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In an embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that dependency aware parallel splitting of operations may be implemented for the data storage system 200 or any other devices that implement a filesystem (e.g., node 202, host device 205, a desktop computer, a tablet, a laptop, a wearable device, a mobile device, a storage device, a server, a virtual machine, a storage virtual machine, etc.).

Figure 3:
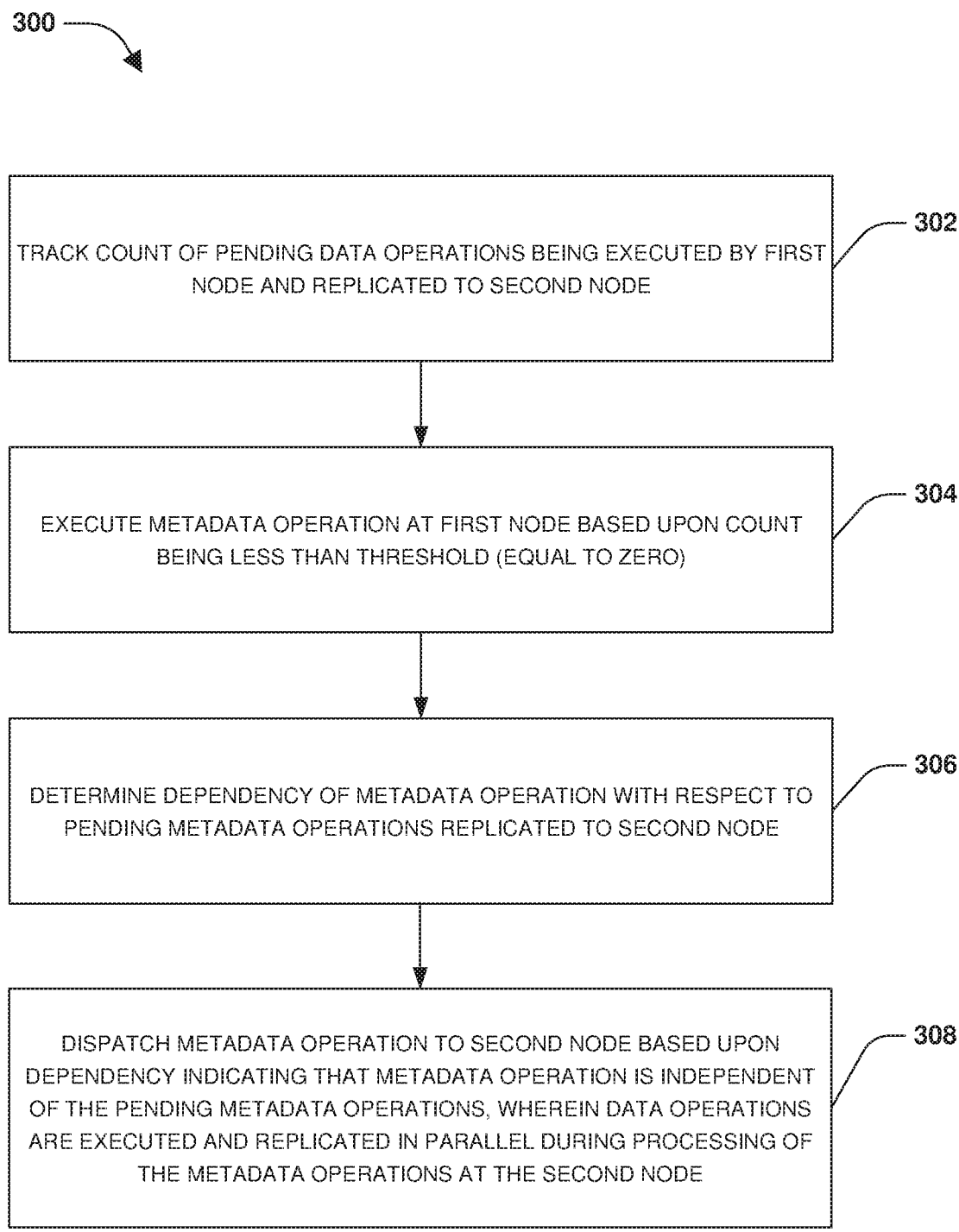
FIG. 3 is a flow chart illustrating an example method for dependency aware parallel splitting of operations.
Figure 4A:
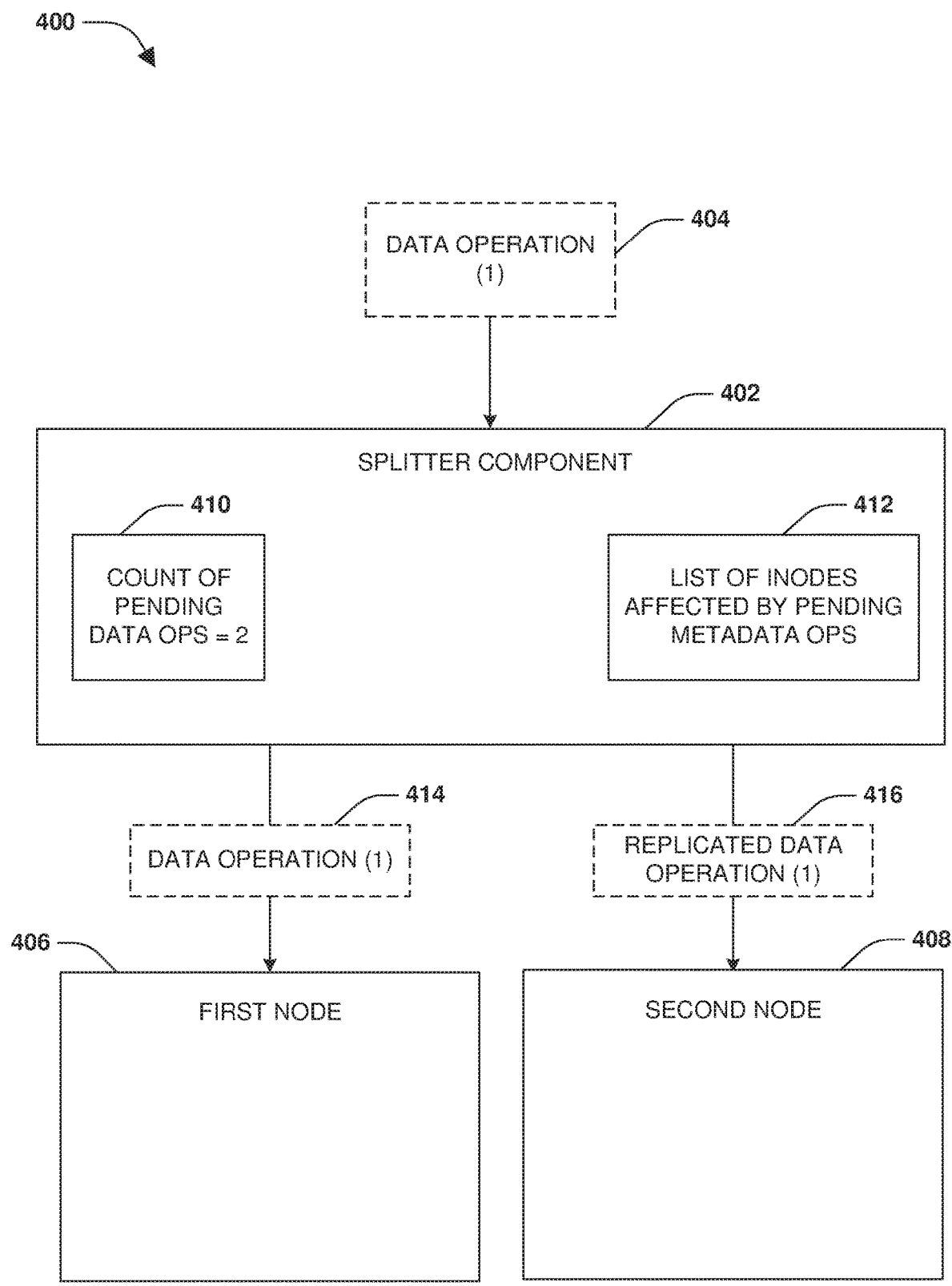
FIG. 4A is a component block diagram illustrating an example system for dependency aware parallel splitting of operations, where a data operation is processed.

One embodiment of dependency aware parallel splitting of operations is illustrated by an exemplary method 300 of FIG. 3 and further described in conjunction with system 400 of FIGS. 4A-4L. A first node 406 may have a synchronous replication relationship with a second node 408, as illustrated by FIG. 4A. The first node 406 and/or the second node 408 may comprise a computing device, a storage controller, a virtual machine, a storage virtual machine, a software as a service, storage functionality executing in a cloud computing environment, or other hardware, software, or combination thereof.

A splitter component 402 is configured to synchronously replicate operations targeting the first node 406 to the second node 408. For example, the splitter component 402 intercepts a first data operation 404 targeting a first storage object within the first node 406. The first data operation 404 may comprise a write operation to modify the first node 406. The first data operation 404 can be evaluated to determine what inodes (e.g., inode numbers) will be affected by execution of the first data operation 404, such as an inode of the first storage object. The splitter component 402 may transmit the first data operation 414 to the first node 406 for execution upon the first storage object, along with replicating the first data operation 414 as a replicated first data operation 416 to the second node 408 for execution upon the second storage object. The first data operation 414 and the replicated first data operation 416 may be transmitted in parallel (e.g., transmitted without having to wait on the other operation to complete first). Data operations can be processed in parallel amongst the first node 406 and the second node 408 if there are no metadata operations executing at the first node 406 and if an inode specified by a payload of a data operation is not in common with affected inodes of pending metadata operations dispatched to the second node. It may be appreciated that the comparison of inodes may relate to comparing inode numbers to see if there are any common inode numbers.

At 302, a count 410 of pending data operations is maintained by the splitter component 402. The splitter component 402 updates the count 410 of pending data operations to a value of 2 in order to indicate that the first data operation 414 and the replicated first data operation 416 are pending. The count 410 is incremented when a data operation is dispatched to one of the nodes. The count is decremented when a notification is received that a node has successfully executed a data operation.

Figure 4B:
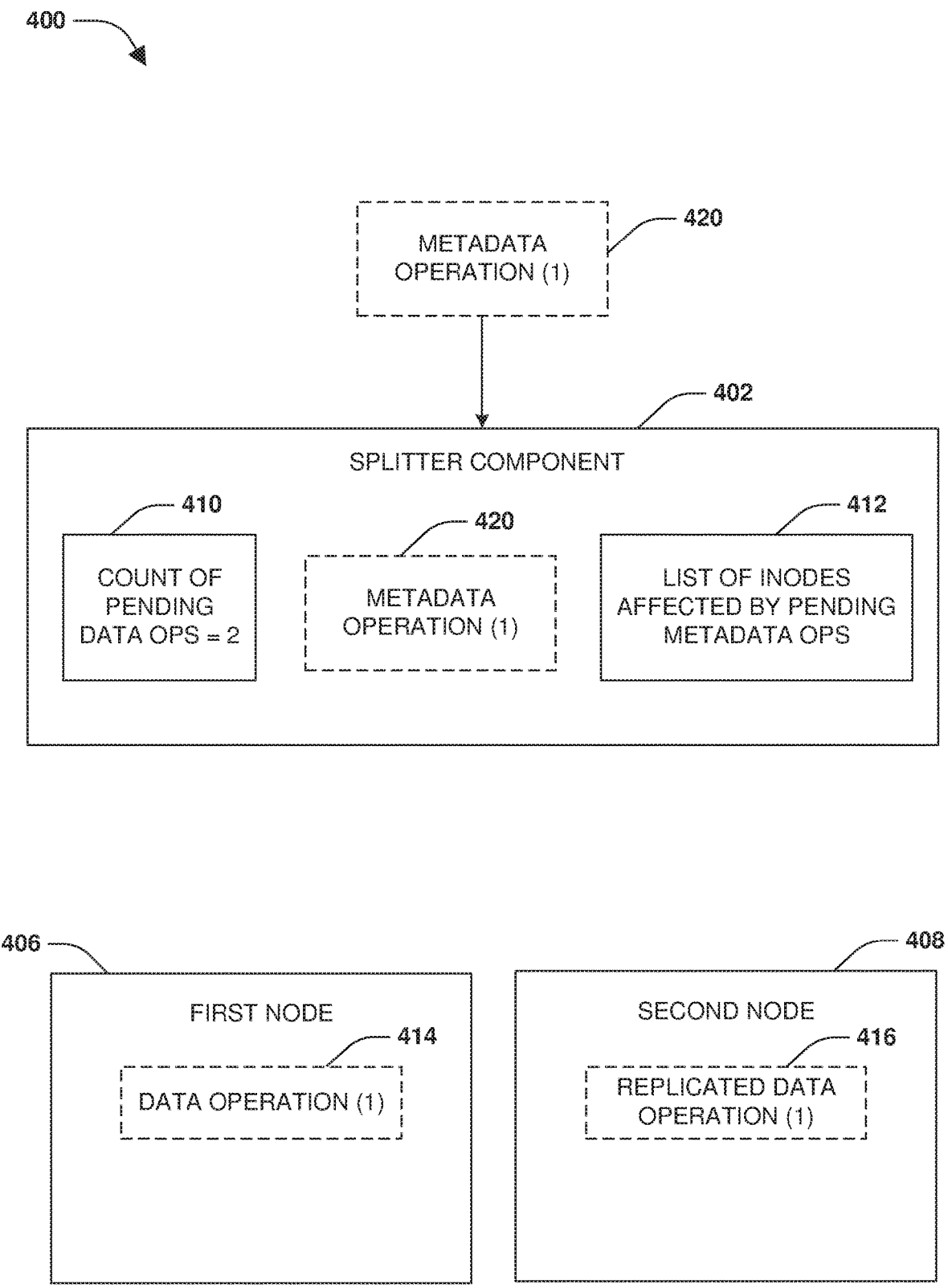
FIG. 4B is a component block diagram illustrating an example system for dependency aware parallel splitting of operations, where a metadata operation is received.

If the count 410 is equal to or greater than a threshold (e.g., greater than or equal to 1 to indicate that at least one data operation is pending at a node), then incoming metadata operations will be withheld from being executed at either node. For example, a first metadata operation 420 is received by the splitter component 402, as illustrated by FIG. 4B. Because the count 410 of pending data operations is equal to or greater than the threshold (e.g., greater than or equal to 1 because the first data operation 414 is pending at the first node 406 and the replicated first data operation 416 is pending at the second node 408), the first metadata operation 420 is held by the splitter component 402 until the count 410 of pending data operations is less than the threshold. In an example, metadata operations are withheld from being dispatched if the count 410 has a value other than zero. Otherwise, if the count 410 is zero then the first metadata operation 420 is not withheld due to pending data operations.

Figure 4C:
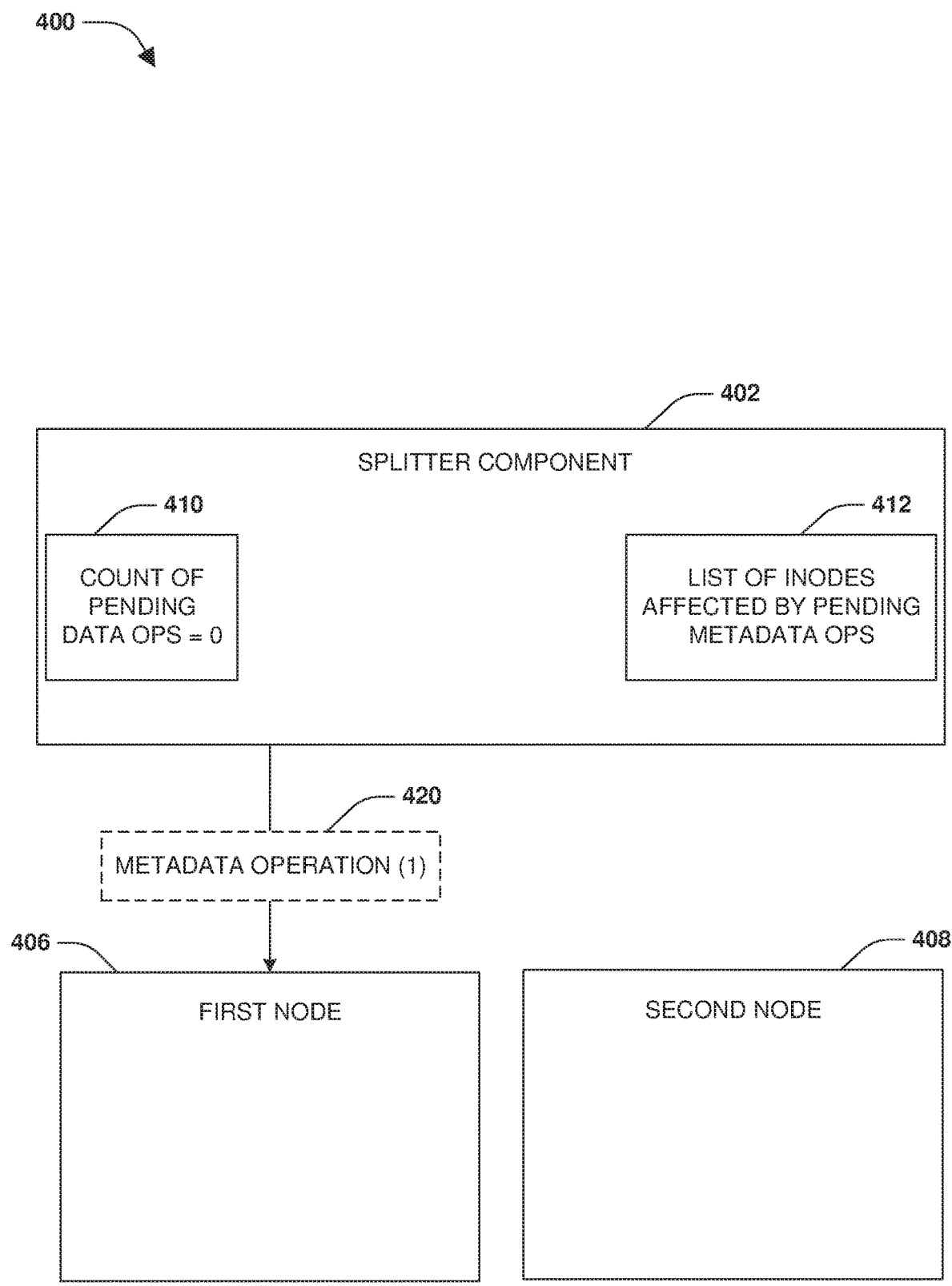
FIG. 4C is a component block diagram illustrating an example system for dependency aware parallel splitting of operations, where a first metadata operation is executed by a first node.

The splitter component 402 may receive notifications that the first node 406 successfully executed the first data operation 414 and the second node 408 successfully executed the replicated first data operation 416. Accordingly, the splitter component 402 decrements the count 410 of pending data operations to zero, as illustrated by FIG. 4C. At 304, the first metadata operation is dispatched to the first node 406 for execution based upon the count 410 of pending data operations being less than the threshold (e.g. count 410 of 0 being less than the threshold of 1, thus indicating that there are no pending data operations being executed by the first node 406 and/or the second node 408).

Figure 4D:
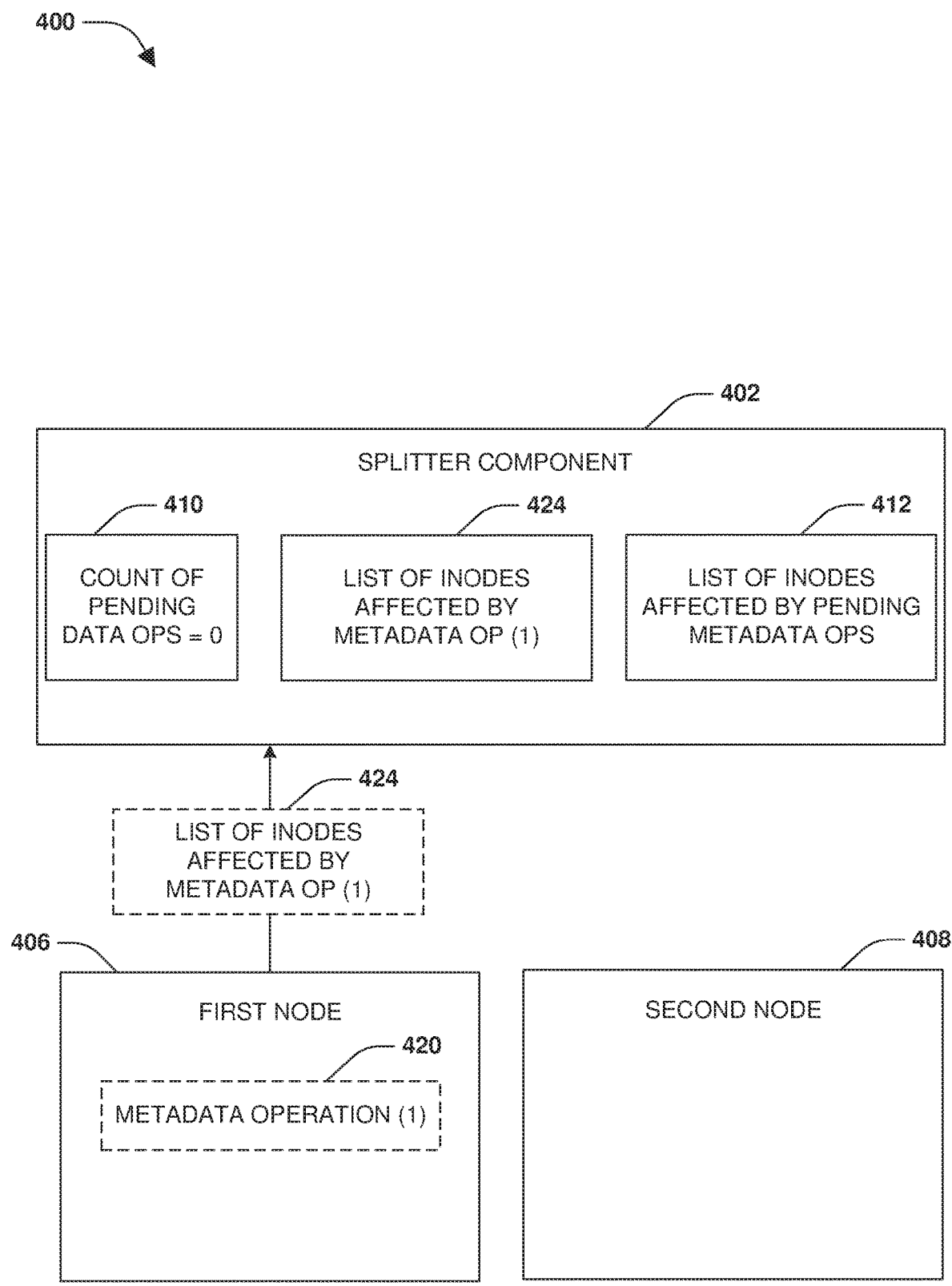
FIG. 4D is a component block diagram illustrating an example system for dependency aware parallel splitting of operations, where a list of affected inodes is received for a first metadata operation.

As a result of the first metadata operation 420 being executed by the first node 406, a list 424 of inodes affected by the first metadata operation 420 is received from the first metadata operation 420 by the splitter component 402, as illustrated by FIG. 4D. The list 424 of inodes affected by the first metadata operation 420 may indicate that the inode of the first storage object was modified.

In an example, the first storage object may comprise a composite object. The composite object is associated with a base inode, a set of streams with their own inodes, and an inode of a stream directory. Metadata operation handlers executing metadata operations are modified to return the base inode, inodes of the set of streams, and the inode of the stream directory as affected inodes (e.g., inode numbers) for metadata operations targeting the composite object regardless of whether the metadata operations affect all of the inodes. This is because inconsistent results can occur, such as where timestamps are assigned to the base inode when any stream is modified. Thus, the base inode can have an inconsistent value if metadata operations targeting different streams of the composite object are executed out of order. For example, a composite object comprises a base inode, along with a first stream and a second stream within a stream directory. A metadata operation targeting the first stream will affect a base timestamp and the first stream. A data operation may subsequently be directed to the second stream. The data operation will only specify the second stream within its payload as what will be affected. However, the data operation will actually also affect the base timestamp of the base inode. If the metadata operation merely reports the base inode and the first stream as being affected, then the data operation will consider itself independent of the metadata operation, and thus results of the operations can be inconsistent if the data operation to the second stream occurs before the metadata operation executing at the first node. However, if execution of the metadata operation at the first node is configured to report the base inode, the stream directory, the first stream, and the second stream as being affected, then the subsequent data operation targeting the second stream will consider itself dependent upon the prior metadata operation, and thus will wait for the prior metadata operation to first complete at the first node for consistent results.

In an example, metadata operations are sequentially executed at the first node 406. For example, an incoming metadata operation is not dispatched to the first node 406 until execution the first metadata operation 420 is acknowledged by the first node 406 as complete. This is because there may be overlap in inodes affected by the metadata operations. These affected inodes are not known until after execution, and thus the affected inodes would be unknown at the time of dispatch because affected inodes are only realized once a metadata operation has finished execution. Thus, inconsistencies could arise where metadata operations are executed in a different order by the first node 406 than the ordered dispatched by the splitter component 402 to the first node 406. For example, if the first metadata operation 420 is to set a value to 1 and the incoming metadata operation is to change that value from 1 to 4, then a consistent result would be the value being 4 after the metadata operations are complete. However, if the first metadata operation 420 is executed after the incoming metadata operation, then an inconsistent result would arise because the final value would be 1 instead of the expected value of 4.

Figure 4E:
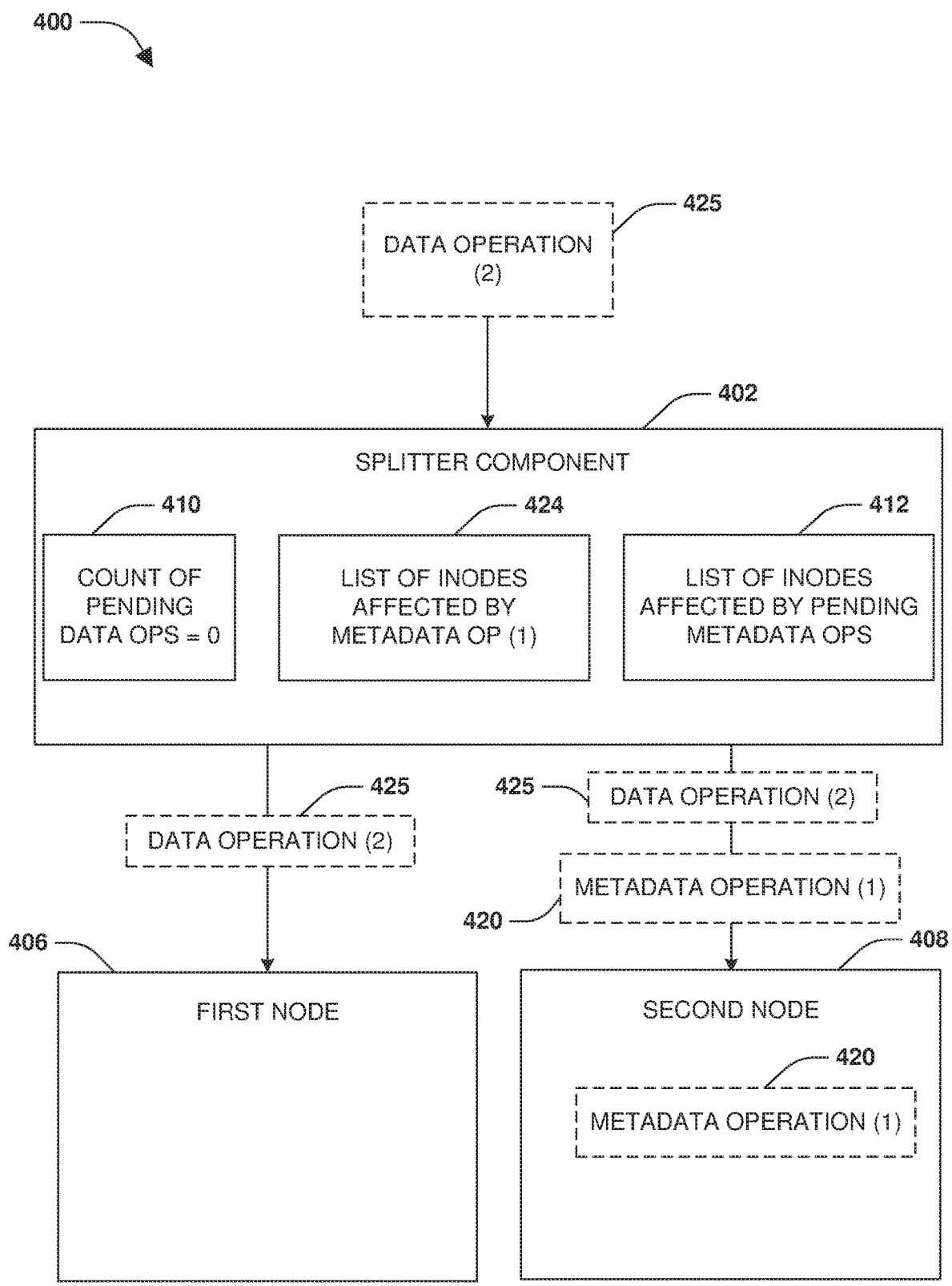
FIG. 4E is a component block diagram illustrating an example system for dependency aware parallel splitting of operations, where a first metadata operation is transmitted to a second node for execution.

At 306, a dependency of the first metadata operation 420 with respect to pending metadata operations replicated to the second node 408 is determined, as illustrated by FIG. 4E. The dependency is determined based upon whether an inode occurs within both the list 424 of inodes affected by the first metadata operation 420 and a list 412 of inodes affected by pending metadata operations dispatched to the second node 408 but not yet acknowledged as complete. It may be appreciated that the comparison of inodes may relate to comparing inode numbers. When a pending metadata operation is dispatched to the second node 408, the affected inodes of that pending metadata operation are inserted into the list 412, and are removed once the pending metadata operation is acknowledged by the second node 408 as being complete.

The first metadata operation 420 is determined to be an independent metadata operation that is independent of pending metadata operations if all affected inodes (e.g., inode numbers) within the list 424 of inodes affected by the first metadata operation 420 do not match any affected inodes (e.g., inode numbers) within the list 412 of inodes affected by pending metadata operations. The first metadata operation 420 is determined to be a dependent metadata operation that is dependent with respect to one or more pending metadata operations if at least one affected inode (e.g., inode number) within the list 424 of inodes affected by the first metadata operation 420 matches at least one affected inode (e.g., inode number) within the list 412 of inodes affected by pending metadata operations. At 308, the first metadata operation 420 is dispatched to the second node 408 based upon a determination (e.g., an inode number comparison) that no affected inodes within the list 424 of inodes affected by the first metadata operation 420 match any affected inodes within the list 412 of inodes affected by pending metadata operations, as illustrate by FIG. 4E. Otherwise, the first metadata operation 420 would be withheld from being dispatched if at least one affected inode within the list 424 of inodes affected by the first metadata operation 420 matches at least one affected inode within the list 412 of inodes affected by pending metadata operations.

In this way, a plurality of independent metadata operations may be dispatched to the second node 408 without having to wait on notifications as to other independent metadata operations successfully completed because there is no overlap in inodes affected by the plurality of independent metadata operations. This decreases the replication latency of metadata operations to the second node 408 because independent metadata operations do not have to be sequentially dispatched to the second node 408 since the independent metadata operations affect non-overlapping sets of inodes with respect to one another.

Once the first metadata operation 420 is dispatched to the second node 408, the list 412 of inodes affected by pending metadata operations is updated with affected inodes (e.g., inode numbers) from the list 424 of inodes that are affected by the first metadata operation 420. For example, the list 424 is updated to indicate that the inode of the first storage object was affected by execution of the first metadata operation 420.

In an example, a second data operation 425 is received by the splitter component 402 while the first metadata operation 420 is being executed by the second node 408. The splitter component 402 may evaluate the second data operation 425 to identify a third inode specified in a payload of the second data operation, and thus the third inode will be affected by the second data operation 425. The splitter component 402 determines that the third inode is not specified in the list 412 of inodes affected by pending metadata operations (e.g., an inode number of the third inode is not listed within the list 412) such as the first metadata operation 420 pending at the second node 408. Accordingly, the splitter component 402 transmits the second data operation 425 to the first node 406 and replicates the second data operation 425 to the second node 408 in parallel because there are no metadata operations executing at the first node 406 and because the third inode will not be affected by any pending metadata operations at the second node 408.

Figure 4F:
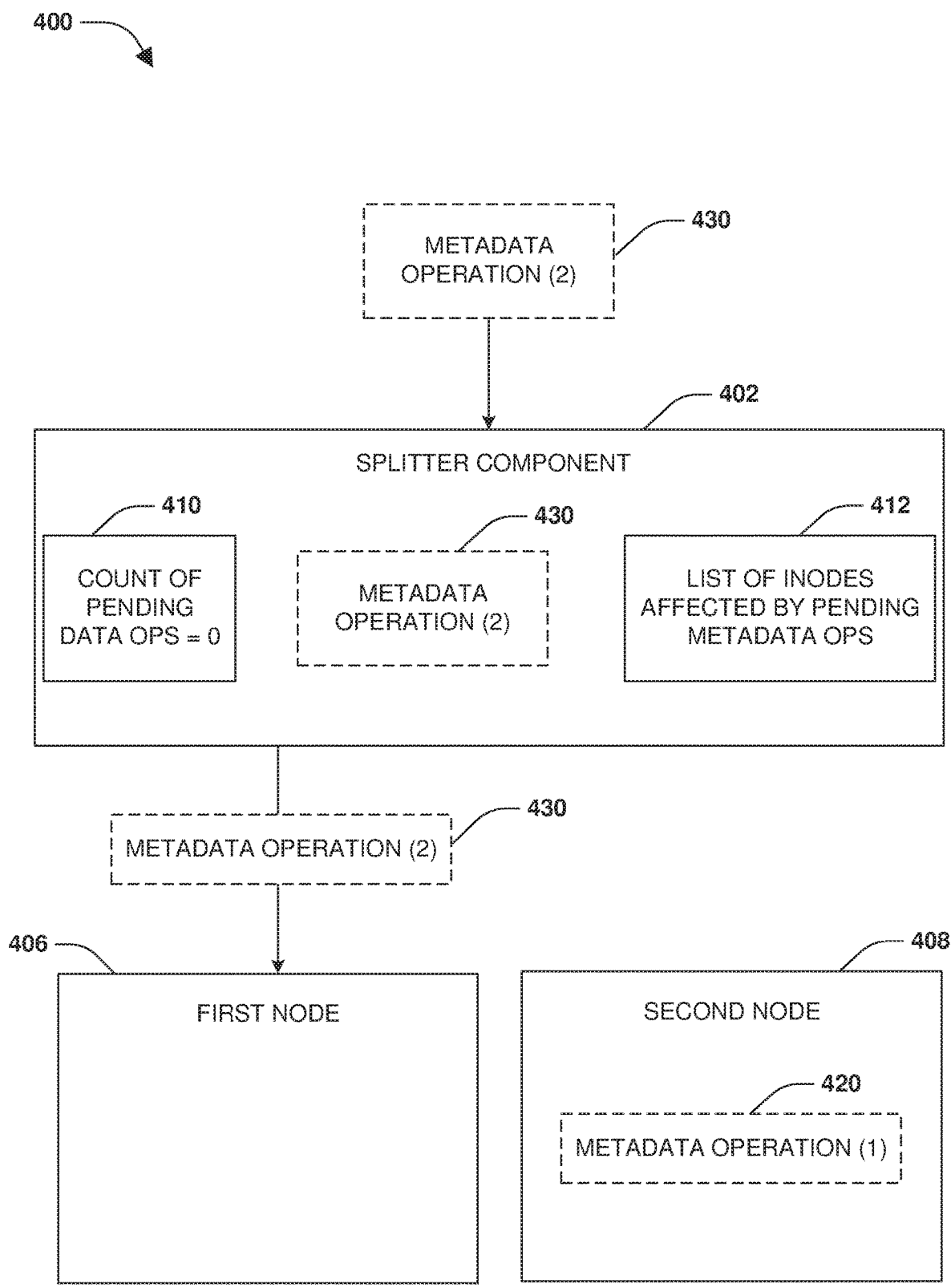
FIG. 4F is a component block diagram illustrating an example system for dependency aware parallel splitting of operations, where a second metadata operation is received and transmitted to a first node for execution.

A second metadata operation 430 may be intercepted by the splitter component 402 while the first metadata operation 420 is pending at the second node 408, as illustrated by FIG. 4F. Because the count 410 of pending data operations is less than the threshold (e.g., the count 410 of zero indicates that no data operations are pending) and there are no pending metadata operations at the first node 406 (e.g., metadata operations are sequentially dispatched to the first node 406 since affected inodes are not known until after execution), the second metadata operation 430 is dispatched to the first node 406 for execution.

Figure 4G:
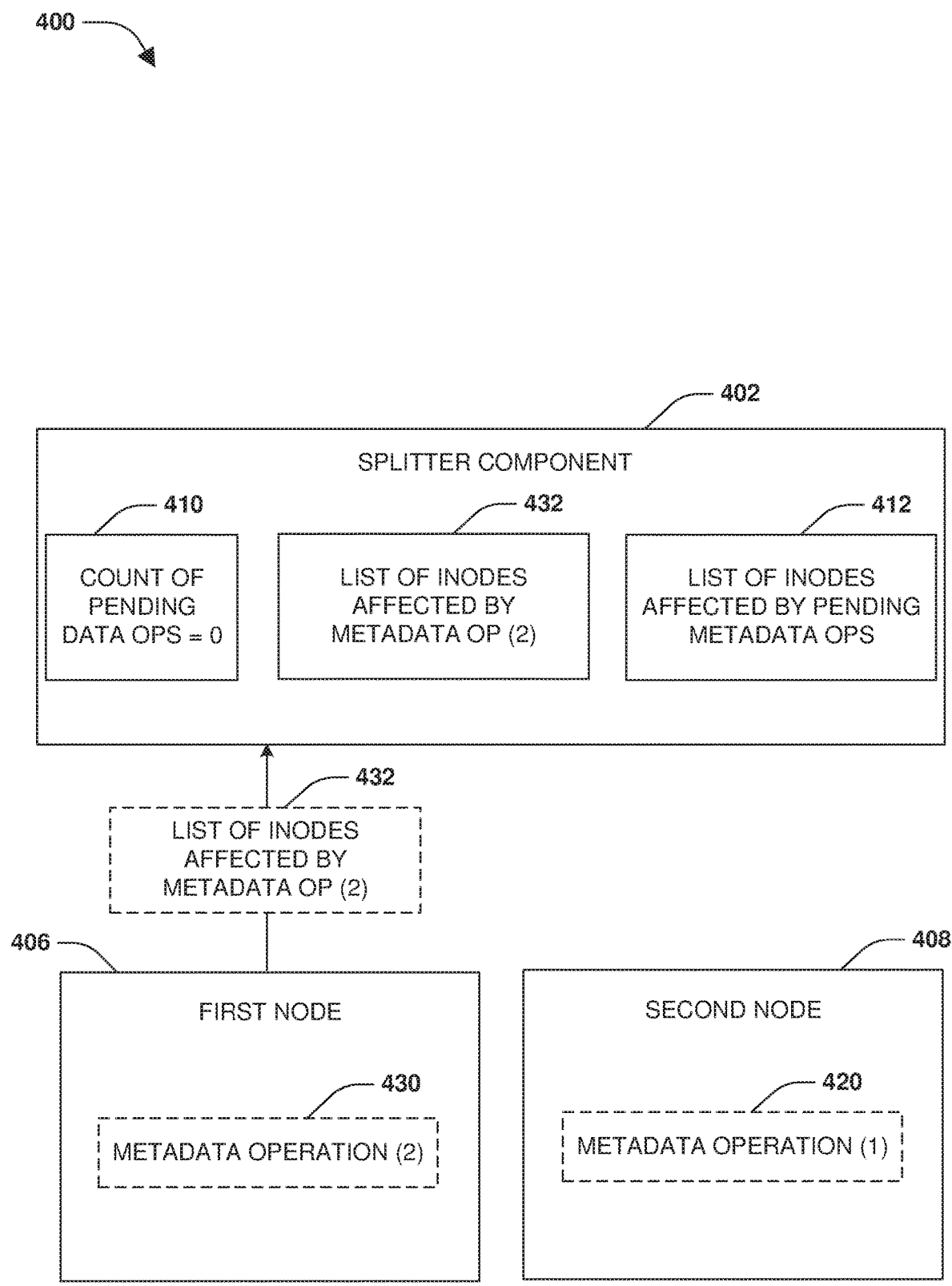
FIG. 4G is a component block diagram illustrating an example system for dependency aware parallel splitting of operations, where a list of affected inodes is received for a second metadata operation.
Figure 4H:
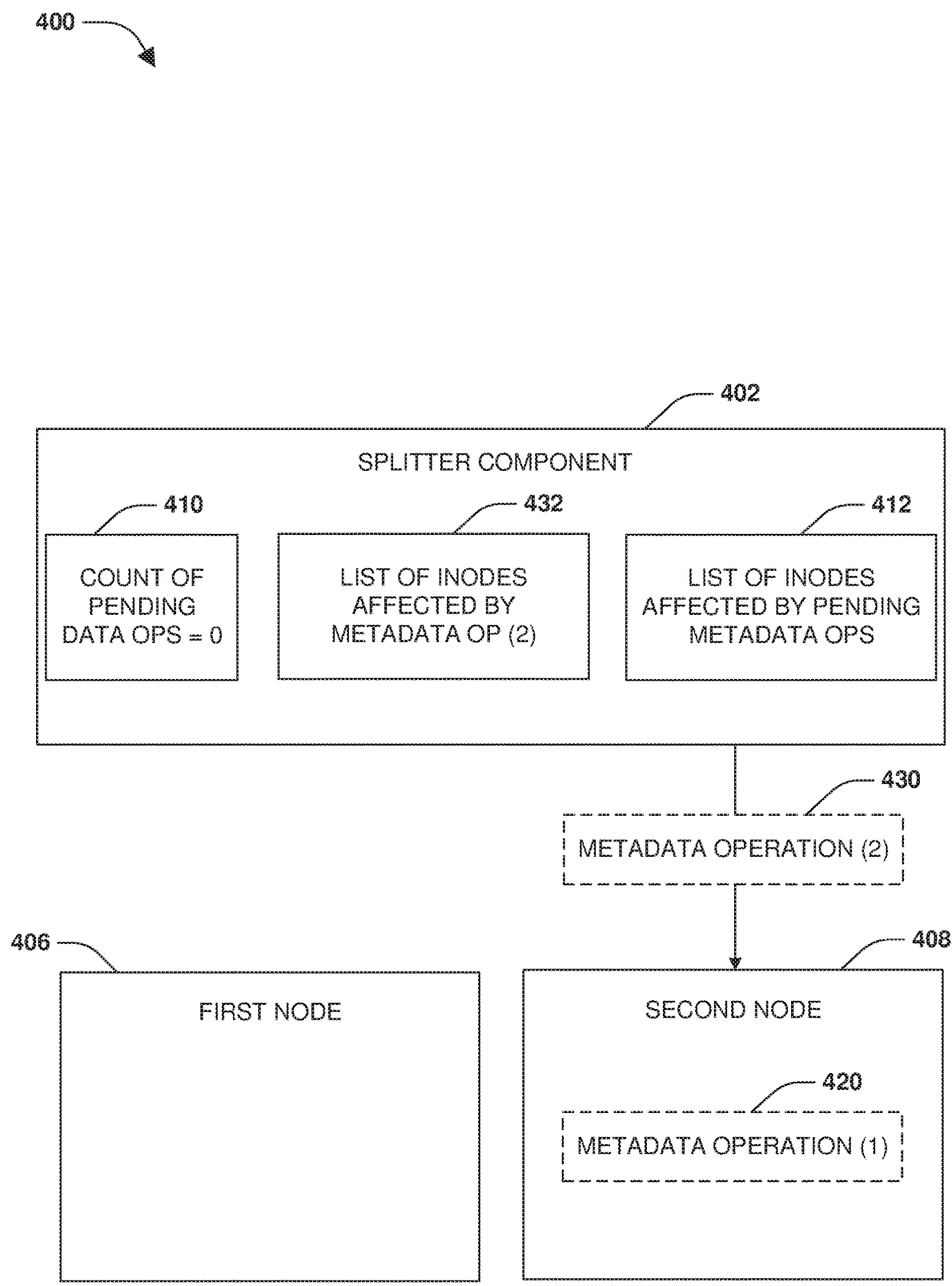
FIG. 4H is a component block diagram illustrating an example system for dependency aware parallel splitting of operations, where a second metadata operation is transmitted to a second node for execution.

The first node 406 may execute the second metadata operation 430, resulting in a list 432 of inodes affected by the second metadata operation 430 (e.g., the second metadata operation 430 may affect an inode of a second storage object). The list 432 of inodes affected by the second metadata operation 430 are returned to the splitter component 402, as illustrated by FIG. 4G. The splitter component 402 compares (e.g., a comparison of inode numbers) the list 432 of inodes affected by the second metadata operation 430 to the list 412 of inodes affected by pending metadata operations (e.g., the list 412 may indicate that the inode of the first storage object will be affected the pending first metadata operation 420 being executed by the second node 408) to determine a dependency of the second metadata operation 430.

The splitter component 402 may determine that the second metadata operation 430 is independent of all pending metadata operations dispatched to the second node 408 (e.g., the inode number of the second storage object that will be affected by the second metadata operation 430 is different than the inode number of the first storage object that will be affected by the pending first metadata operation 420). Accordingly, the splitter component 402 dispatches the second metadata operation 430 to the second node 408 without waiting for a response regarding execution of the pending first metadata operation 420.

Once the second metadata operation 430 is dispatched to the second node 408, the list 412 of inodes affected by pending metadata operations is updated with affected inodes (e.g., inode numbers) from the list 432 of inodes that are affected by the second metadata operation 430. For example, the list 424 is updated to indicate that the inode of the second storage object was affected by execution of the second metadata operation 430.

Figure 4I:
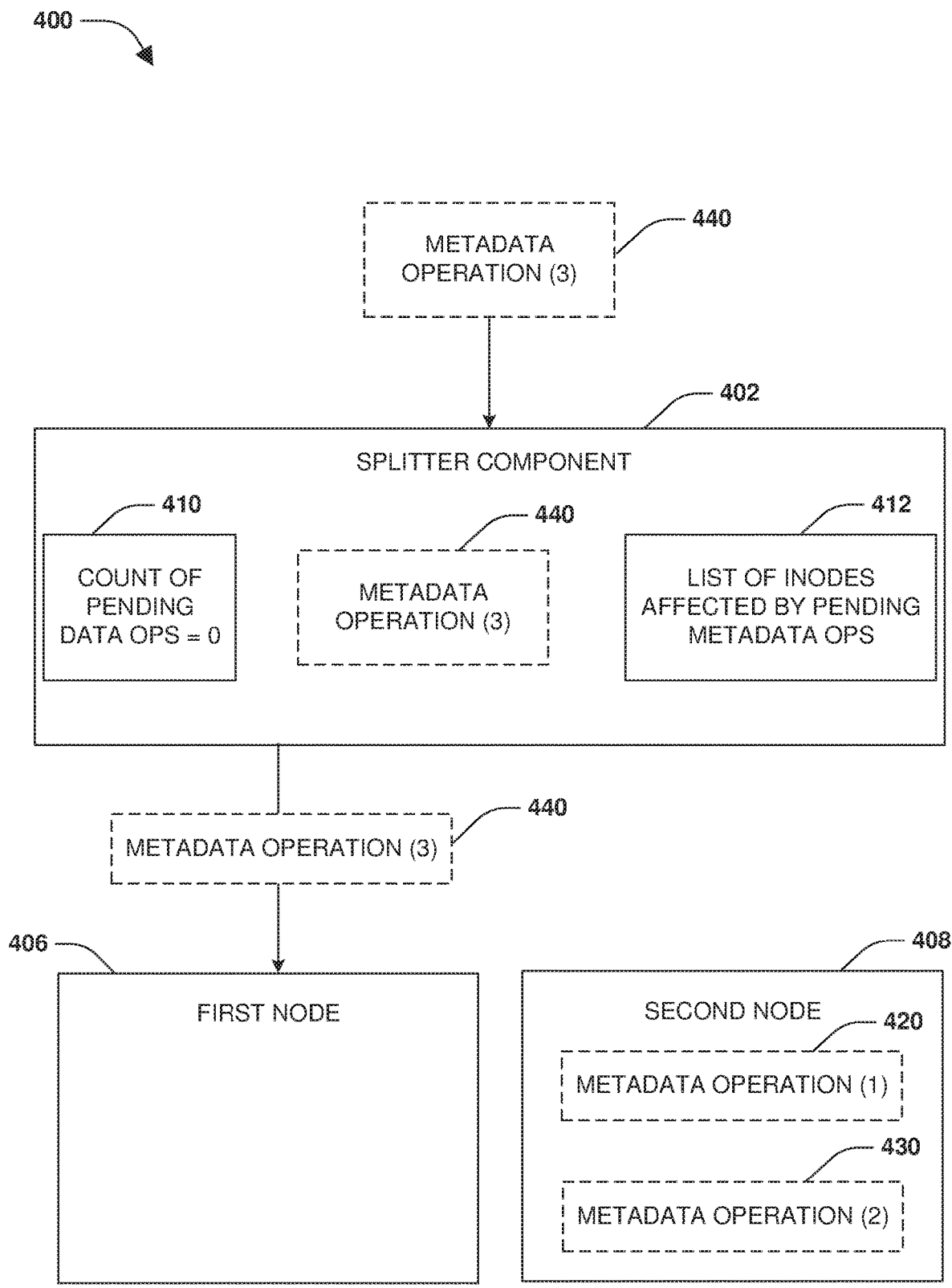
FIG. 4I is a component block diagram illustrating an example system for dependency aware parallel splitting of operations, where a third metadata operation is received and transmitted to a first node for execution.

A third metadata operation 440 may be intercepted by the splitter component 402 while the first metadata operation 420 and the second metadata operation 430 are pending at the second node 408, as illustrated by FIG. 4I. Because the count 410 of pending data operations is less than the threshold (e.g., the count 410 of zero indicates that no data operations are pending) and there are no pending metadata operations at the first node 406 (e.g., metadata operations are sequentially dispatched to the first node 406 since affected inodes are not known until after execution), the third metadata operation 440 is dispatched to the first node 406 for execution.

Figure 4J:
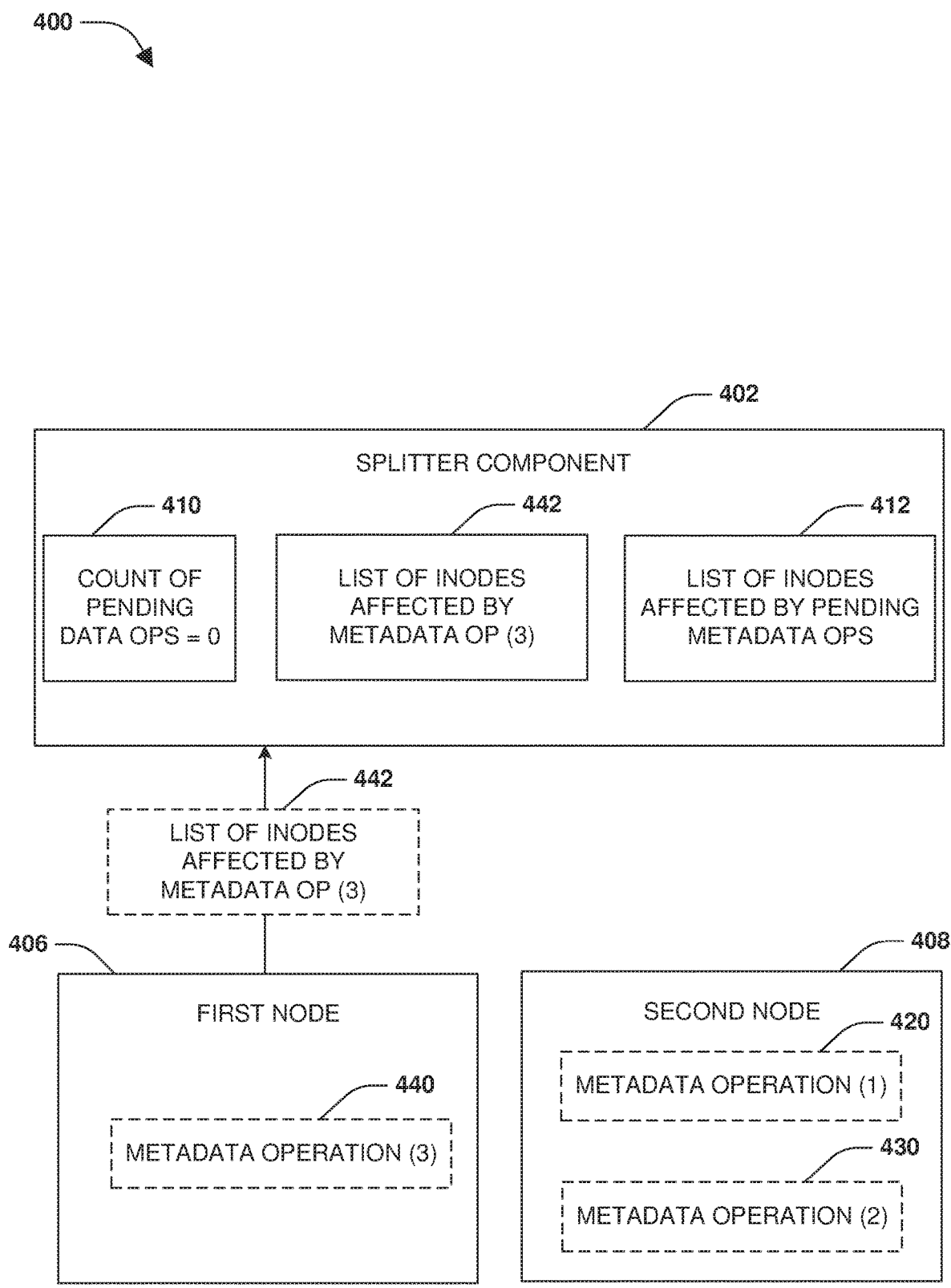
FIG. 4J is a component block diagram illustrating an example system for dependency aware parallel splitting of operations, where a list of affected inodes is received for a third metadata operation.

The first node 406 may execute the third metadata operation 440, resulting in a list 442 of inodes affected by the third metadata operation 440 (e.g., the third metadata operation 440 may affect the inode of a first storage object). The list 442 of inodes affected by the third metadata operation 440 are returned to the splitter component 402, as illustrated by FIG. 4J. The splitter component 402 compares (e.g., inode number comparison) the list 442 of inodes affected by the third metadata operation 440 to the list 412 of inodes affected by pending metadata operations (e.g., the list 412 may indicate that the inode of the first storage object will be affected by the second node 408 executing the pending first metadata operation 420 and that the inode of the second storage object will be affected by the second node 408 executing the pending second metadata operation 430) to determine a dependency of the third metadata operation 440.

Figure 4K:
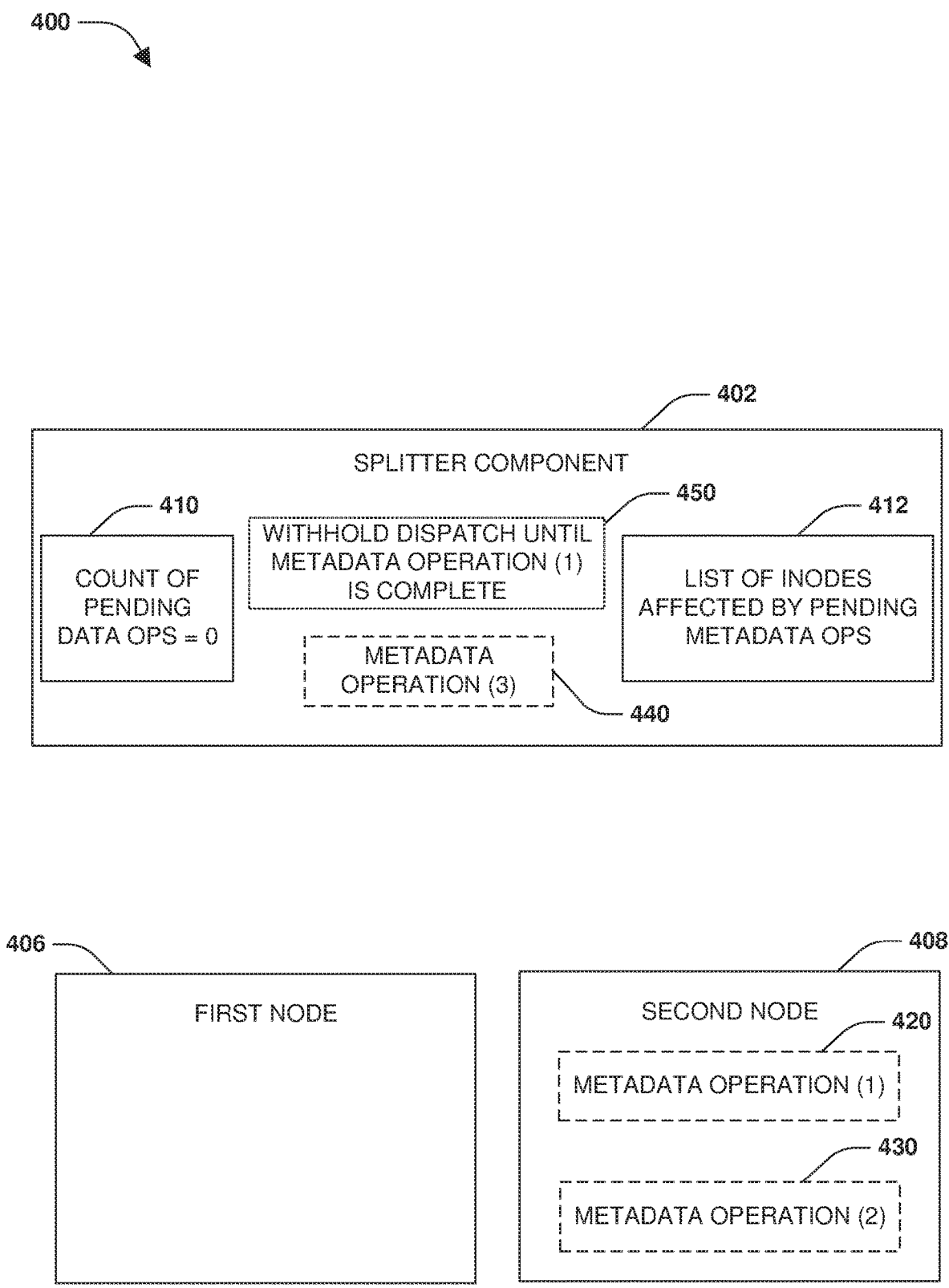
FIG. 4K is a component block diagram illustrating an example system for dependency aware parallel splitting of operations, where a third metadata operation is withheld from being transmitted to a second node until a first metadata operation is finished executing at the second node based upon the third metadata operation and the first metadata operation being dependent metadata operations.

The splitter component 402 may determine that the third metadata operation 440 is dependent with respect to the first metadata operation 420 being executed by the second node 408 based upon the inode of the first storage object (e.g., an inode number associated with the first storage object) occurring within both the list 442 of inodes affected by the third metadata operation 440 and the list 412 of inodes affected by pending metadata operations. Accordingly, the splitter component 402 withholds 450 dispatch of the third metadata operation 440 to the second node 408 until there is no longer any overlap in affected inodes (e.g., inode numbers) between the list 442 of inodes affected by the third metadata operation 440 and the list 412 of inodes affected by pending metadata operations, as illustrated by FIG. 4K. For example, the third metadata operation 440 may be dispatched to the second node 408 once the first metadata operation 420 is acknowledged to the splitter component 402 as complete and the overlapping inode number of the first storage object is removed from the list 412 of inodes affected by pending metadata operations, and thus there is no overlap in inode numbers between the list 442 of inodes affected by the third metadata operation 440 and the list 412 of inodes affected by pending metadata operations.

Figure 4L:
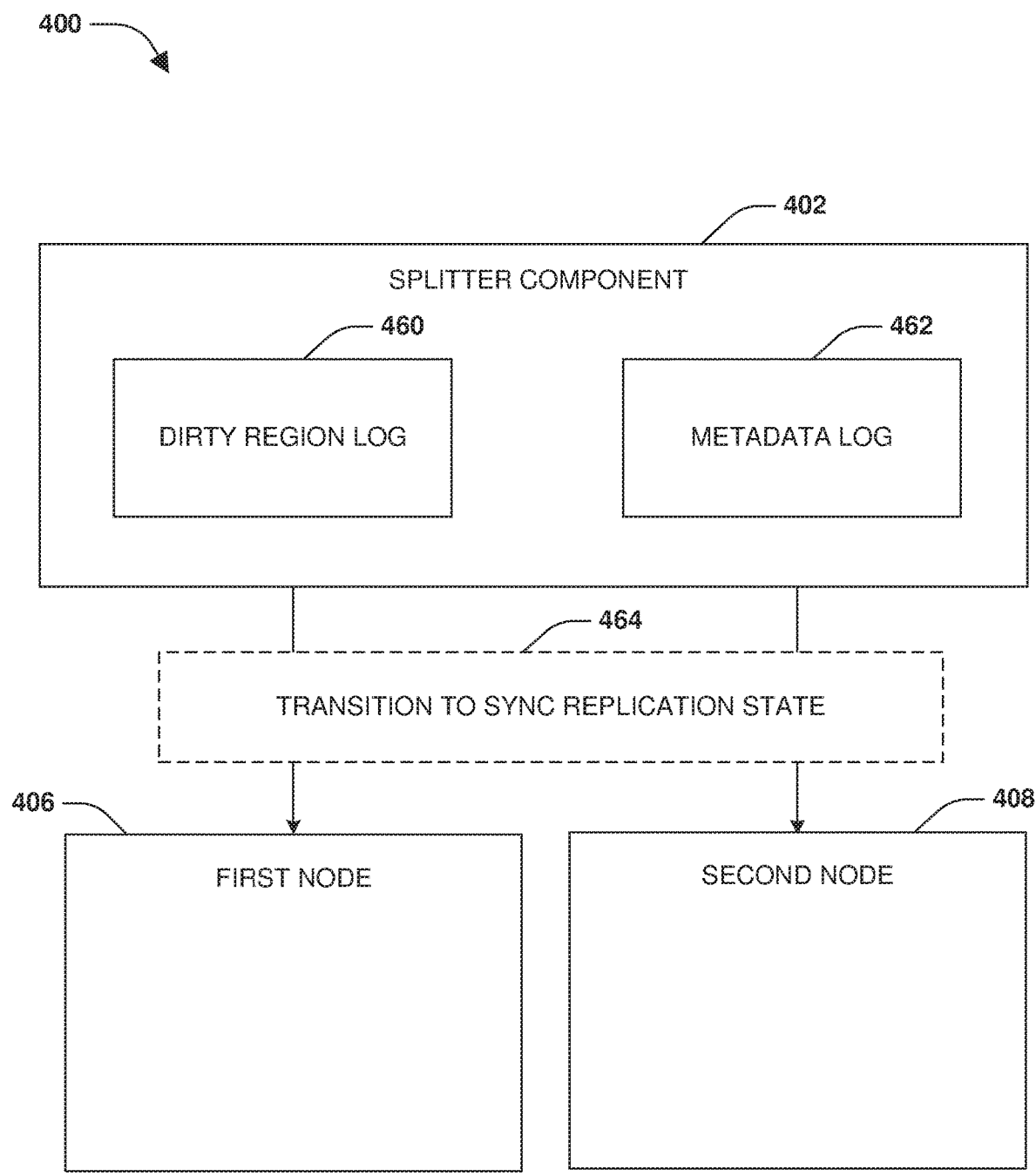
FIG. 4L is a component block diagram illustrating an example system for dependency aware parallel splitting of operations, where a first node and a second node are transitioned from an asynchronous replication state to a synchronous replication state.

Dependency aware parallel splitting of operations may be implemented during a transition to a synchronous replication state, as illustrated by FIG. 4L. In an example, the first node 406 and the second node 408 may fall out of sync or initially start in a non-synchronous replication state, and thus the first node 406 and the second node 408 are determined to be in the non-synchronous replication state, such as an asynchronous replication state. Accordingly, a resynchronization 464 is performed to transition the first node 406 and the second node 408 from the non-synchronous replicate state to the synchronous replication state. For example, the resynchronization 464 may be performed between a first storage object (e.g., a volume) of the first node 406 and a second storage object of the second node 408.

During the transition, a dirty region log 460 is used to track regions within the first storage object that are modified by data operations, such as write operations executed during a last asynchronous incremental transfer. That is, asynchronous incremental transfers may be initially performed to incrementally transfer data from the first storage object to the second storage object to help make the second storage object comprise more of the same data as the first storage object. The dirty region log 460 may comprise bits that can be set to either a dirty indicator or a clean indicator. A bit may be mapped to a region within the first storage object. Thus, the bit can be set to the dirty indicator to indicate that a data operation has modified the region because the region now comprises data not yet replicated to the second storage object. The bit can be set to the clean indicator to indicate that the region is now clean because the region has not been modified with data not yet replicated to the second storage object, and thus the region of the first storage object comprises the same data as a corresponding region within the second storage object.

A metadata log 462 is used to track metadata operations that modify the first storage object, such as a create operation (e.g., a create file operation, a create LUN operation, etc.), a link operation, an unlink operation, a rename operation (e.g., a file rename operation, etc.), a set attribute operation (e.g., an assign permissions operation), etc. In particular, copies of metadata operations executed upon the first storage object during the last asynchronous transfer are inserted into the metadata log 462.

The metadata operations within the metadata log 462 are replicated to the second storage object in a manner that preserves dependencies between metadata operations so that consistency is maintained between the first storage object of the first node 406 and second storage object of the second node 408. As opposed to merely dispatching metadata operations from the metadata log 462 to the second node 408 in a sequential manner, independent metadata operations are dispatched to the second node 408 without waiting on other independent metadata operations to first complete. This improves the efficiency and processing time of the resynchronization 464. In an example, a first metadata operation and a second metadata operation are dispatched from the metadata log 462 to the second node 408 in parallel (e.g., both are dispatched without waiting for the other to first complete) based upon the first metadata operation and the second metadata operation affected different inodes (e.g., the metadata operations do not affect any of the same inodes). In contrast, dependent metadata operations are sequentially dispatched to the second node 408. For example, a metadata operation is withheld from being dispatched to the second node 408 until a pending metadata operation has completed execution at the second node 408 based upon the metadata operation and the pending metadata operation affecting a same inode.

After the metadata operations are replicated to the second node 408 for execution upon the second storage object, the dirty regions identified by the dirty region log 460 are replicated from the first storage object to the second storage object during a data scan phase. That is, the data within the dirty regions (e.g., "dirty" data not yet replicated to the second storage object) is transmitted to the second node 408 for storage into corresponding regions within the second storage object. The replication of the dirty region is triggered based upon completion of the replication of the metadata operations. In an example, atomic data operations are performed to read the dirty data tracked by the dirty region log 460 and write that dirty data to the second node 408 during the data scan phase. During the data scan phase, incoming metadata operations are withheld from execution upon the first node 406 until the data scan phase is complete. An atomic data operation is withheld from execution until pending metadata operations affecting overlapping inodes have completed.

Figure 5:
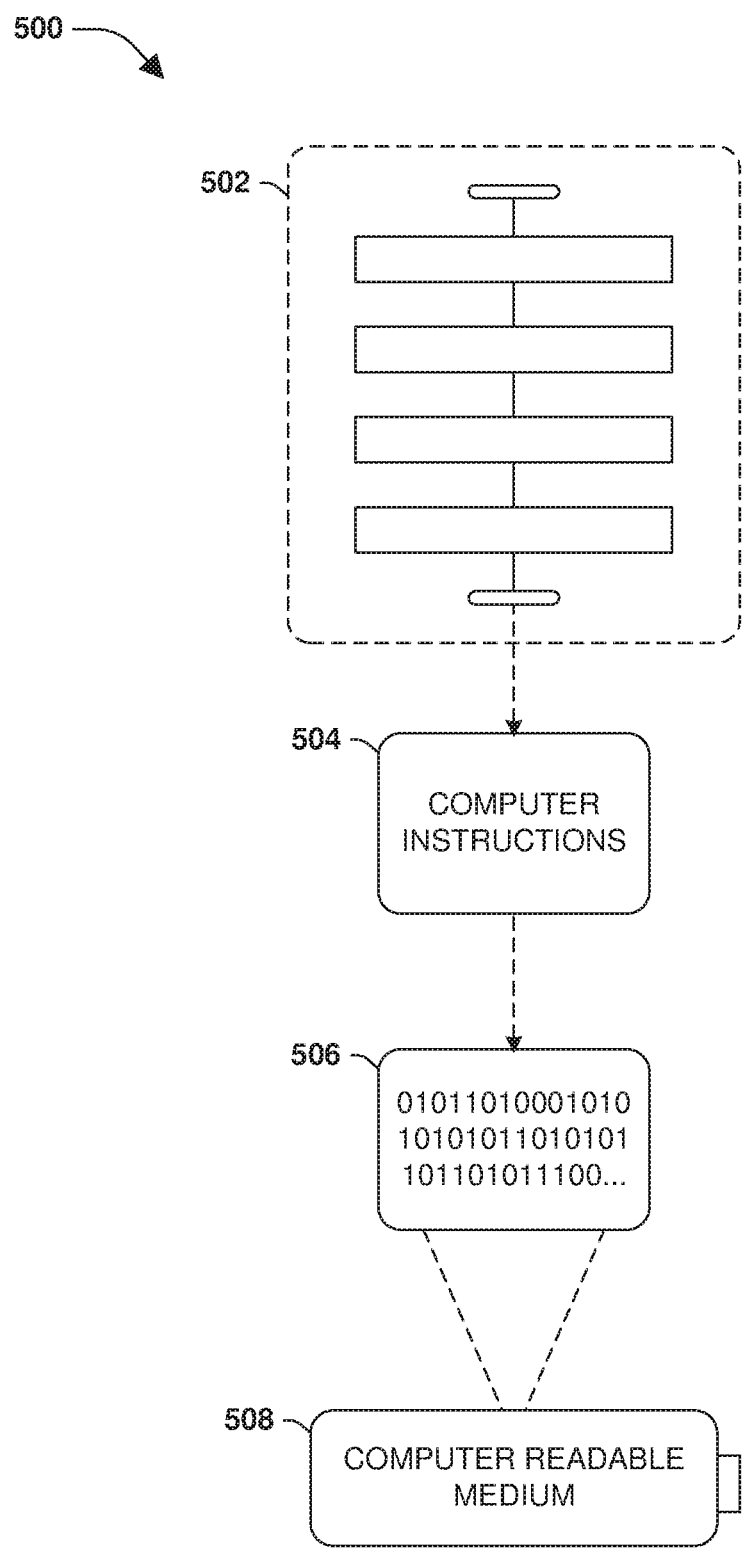
FIG. 5 is an example of a computer readable medium in which an embodiment of the invention may be implemented.

Still another embodiment involves a computer-readable medium 500 comprising processor-executable instructions configured to implement one or more of the techniques presented herein. An example embodiment of a computer-readable medium or a computer-readable device that is devised in these ways is illustrated in FIG. 5, wherein the implementation comprises a computer-readable medium 508, such as a compact disc-recordable (CD-R), a digital versatile disc-recordable (DVD-R), flash drive, a platter of a hard disk drive, etc., on which is encoded computer-readable data 506. This computer-readable data 506, such as binary data comprising at least one of a zero or a one, in turn comprises a processor-executable computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable computer instructions 504 are configured to implement a system, such as at least some of the exemplary system 400 of FIGS. 4A-4L, for example. Many such computer-readable media are contemplated to operate in accordance with the techniques presented herein.

Figure 6:
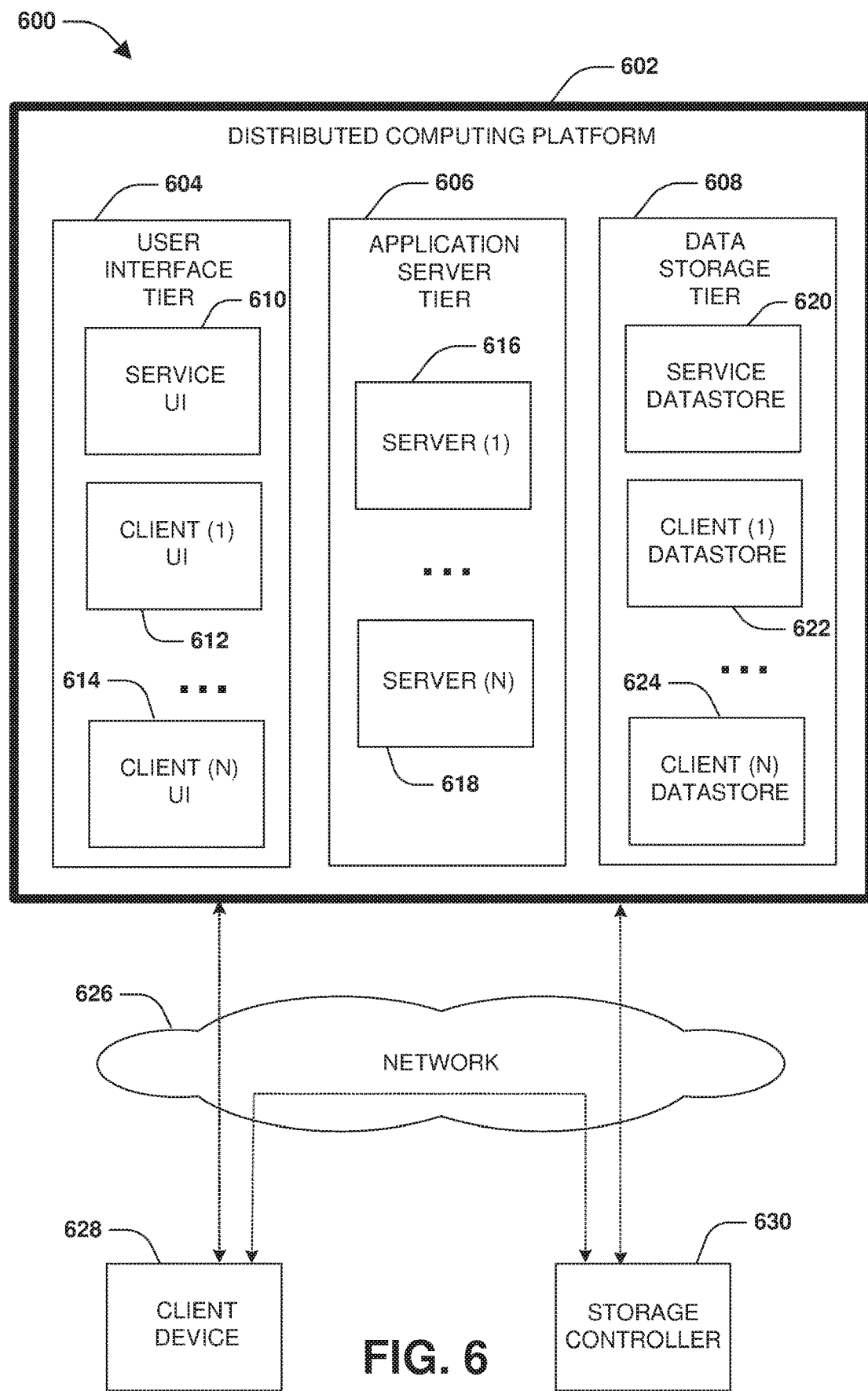
FIG. 6 is a component block diagram illustrating an example computing environment in which an embodiment of the invention may be implemented.

FIG. 6 is a diagram illustrating an example operating environment 600 in which an embodiment of the techniques described herein may be implemented. In one example, the techniques described herein may be implemented within a client device 628, such as a laptop, tablet, personal computer, mobile device, wearable device, etc. In another example, the techniques described herein may be implemented within a storage controller 630, such as a node configured to manage the storage and access to data on behalf of the client device 628 and/or other client devices. In another example, the techniques described herein may be implemented within a distributed computing platform 602 such as a cloud computing environment (e.g., a cloud storage environment, a multi-tenant platform, etc.) configured to manage the storage and access to data on behalf of the client device 628 and/or other client devices.

In yet another example, at least some of the techniques described herein are implemented across one or more of the client device 628, the storage controller 630, and the distributed computing platform 602. For example, the client device 628 may transmit operations, such as data operations to write data and metadata operations (e.g., a create file operation, a rename directory operation, a resize operation, a set attribute operation, etc.), over a network 626 to the storage controller 630 for implementation by the storage controller 630 upon storage. The storage controller 630 may store data associated with the operations within volumes or other data objects/structures hosted within locally attached storage, remote storage hosted by other computing devices accessible over the network 626, storage provided by the distributed computing platform 602, etc. The storage controller 630 may replicate the data and/or the operations to other computing devices so that one or more replicas, such as a destination storage volume that is maintained as a replica of a source storage volume, are maintained. Such replicas can be used for disaster recovery and failover.

The storage controller 630 may store the data or a portion thereof within storage hosted by the distributed computing platform 602 by transmitting the data to the distributed computing platform 602. In one example, the storage controller 630 may locally store frequently accessed data within locally attached storage. Less frequently accessed data may be transmitted to the distributed computing platform 602 for storage within a data storage tier 608. The data storage tier 608 may store data within a service data store 620, and may store client specific data within client data stores assigned to such clients such as a client (1) data store 622 used to store data of a client (1) and a client (N) data store 624 used to store data of a client (N). The data stores may be physical storage devices or may be defined as logical storage, such as a virtual volume, LUNs, or other logical organizations of data that can be defined across one or more physical storage devices. In another example, the storage controller 630 transmits and stores all client data to the distributed computing platform 602. In yet another example, the client device 628 transmits and stores the data directly to the distributed computing platform 602 without the use of the storage controller 630.

The management of storage and access to data can be performed by one or more storage virtual machines (SMVs) or other storage applications that provide software as a service (SaaS) such as storage software services. In one example, an SVM may be hosted within the client device 628, within the storage controller 630, or within the distributed computing platform 602 such as by the application server tier 606. In another example, one or more SVMs may be hosted across one or more of the client device 628, the storage controller 630, and the distributed computing platform 602.

In one example of the distributed computing platform 602, one or more SVMs may be hosted by the application server tier 606. For example, a server (1) 616 is configured to host SVMs used to execute applications such as storage applications that manage the storage of data of the client (1) within the client (1) data store 622. Thus, an SVM executing on the server (1) 616 may receive data and/or operations from the client device 628 and/or the storage controller 630 over the network 626. The SVM executes a storage application to process the operations and/or store the data within the client (1) data store 622. The SVM may transmit a response back to the client device 628 and/or the storage controller 630 over the network 626, such as a success message or an error message. In this way, the application server tier 606 may host SVMs, services, and/or other storage applications using the server (1) 616, the server (N) 618, etc.

A user interface tier 604 of the distributed computing platform 602 may provide the client device 628 and/or the storage controller 630 with access to user interfaces associated with the storage and access of data and/or other services provided by the distributed computing platform 602. In an example, a service user interface 610 may be accessible from the distributed computing platform 602 for accessing services subscribed to by clients and/or storage controllers, such as data replication services, application hosting services, data security services, human resource services, warehouse tracking services, accounting services, etc. For example, client user interfaces may be provided to corresponding clients, such as a client (1) user interface 612, a client (N) user interface 614, etc. The client (1) can access various services and resources subscribed to by the client (1)

through the client (1) user interface 612, such as access to a web service, a development environment, a human resource application, a warehouse tracking application, and/or other services and resources provided by the application server tier 606, which may use data stored within the data storage tier 608.

The client device 628 and/or the storage controller 630 may subscribe to certain types and amounts of services and resources provided by the distributed computing platform 602. For example, the client device 628 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the storage controller 630 can establish a subscription to have access to certain services and resources of the distributed computing platform 602.

As shown, a variety of clients, such as the client device 628 and the storage controller 630, incorporating and/or incorporated into a variety of computing devices may communicate with the distributed computing platform 602 through one or more networks, such as the network 626. For example, a client may incorporate and/or be incorporated into a client application (e.g., software) implemented at least in part by one or more of the computing devices.

Examples of suitable computing devices include personal computers, server computers, desktop computers, nodes, storage servers, storage controllers, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 602, such as a multi-tenant business data processing platform or cloud computing environment, may include multiple processing tiers, including the user interface tier 604, the application server tier 606, and a data storage tier 608. The user interface tier 604 may maintain multiple user interfaces, including graphical user interfaces and/or web-based interfaces. The user interfaces may include the service user interface 610 for a service to provide access to applications and data for a client (e.g., a "tenant") of the service, as well as one or more user interfaces that have been specialized/customized in accordance with user specific requirements, which may be accessed via one or more APIs.

The service user interface 610 may include components enabling a tenant to administer the tenant's participation in the functions and capabilities provided by the distributed computing platform 602, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 608 may include one or more data stores, which may include the service data store 620 and one or more client data stores. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 602 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

In an embodiment, the described methods and/or their equivalents may be implemented with computer executable instructions. Thus, In an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   tracking a count of pending data operations being executed by a first node and replicated to a second node based upon a synchronous replication relationship where data operations are dispatched in parallel to the first node and the second node, wherein a first count for a first pending data operation is decremented in response to both a first pending data operation being executed by the first node and a replica of the first pending data operation being executed by the second node;
   while the count of pending data operations being executed by the first node and replicated to the second node is greater than zero, withholding execution of metadata operations at the first node;
   executing a metadata operation at the first node based upon in response to a determination that the count is equal to zero, wherein, as a result of the execution of the metadata operation a first list of affected inodes modified by the metadata operation are identified;
   determining dependency of the metadata operation with respect to pending metadata operations replicated to the second node based upon whether an inode occurs within both the first list of affected inodes and a second list of affected inodes that are modified by the pending metadata operations; and
   dispatching the metadata operation to the second node based upon the dependency indicating that the metadata operation is independent of the pending metadata operations.

2. The method of claim 1, comprising:
   withholding dispatch of the metadata operation based upon the dependency indicating that at least one inode is within both the first list of affected inodes and the second list of affected inodes.

3. The method of claim 1, comprising:
   withholding dispatch of the metadata operation until pending metadata operations affecting same inodes as the metadata operation have finished executing at the second node.

4. The method of claim 1, comprising:
   dispatching a plurality of independent metadata operations to the second node, wherein the plurality of independent metadata operations are identified as metadata operations that affect non-overlapping sets of inodes with respect to one another.

5. The method of claim 1, comprising:
incrementing the count based upon a data operation being dispatched to one of the first node and in parallel to the second node during synchronous replication of the data operation.

6. The method of claim 5, comprising:
decrementing the count based upon receiving notification that the data operation was executed at one of the first node and the second node.

7. The method of claim 1, comprising:
sequentially executing metadata operations at the first node.

8. The method of claim 1, comprising:
updating the second list of affected inodes with affected inodes within the first list of affected inodes based upon the metadata operation being dispatched to the second node.

9. The method of claim 1, wherein the metadata operation targets a composite object comprising a base inode, a stream directory, and a set of streams, wherein the method comprises:
modifying metadata operation handlers executing metadata operations to return the base inode, inodes of the set of streams, and a node of the stream directory as affected inodes for metadata operations targeting the composite object.

10. The method of claim 1, wherein the metadata operation is determined to be dependent upon a pending metadata operation based upon an affected inode being listed within both the first list of affected inodes of the metadata operation and the second list of affected inodes for the pending metadata operation.

11. The method of claim 1, wherein the metadata operation is determined to be independent upon a pending metadata operation based upon a lack of overlap between the first list of affected inodes of the metadata operation and the second list of affected inodes for the pending metadata operation.

12. The method of claim 1, wherein an incoming metadata operation is processed based upon a lack of metadata operations being processed by the first node, wherein the incoming metadata operation is executed on the first node and replicated in parallel to the second node based upon inodes specified by pending data operations being different than affected inodes of the incoming metadata operation.

13. A non-transitory machine readable medium comprising instructions for performing a method, which when executed by a machine, causes the machine to:
track a count of pending data operations being executed by a first node and replicated to a second node based upon a synchronous replication relationship where data operations are dispatched in parallel to the first node and the second node, wherein a first count for a first pending data operation is decremented in response to both a first pending data operation being executed by the first node and a replica of the first pending data operation being executed by the second node;
while the count of pending data operations being executed by the first node and replicated to the second node is greater than zero, withhold execution of metadata operations at the first node;
execute a metadata operation at the first node in response to a determination that the count is equal to zero, wherein, as a result of the execution of the metadata operation a first list of affected inodes modified by the metadata operation are identified;
determine dependency of the metadata operation with respect to pending metadata operations replicated to the second node based upon whether an inode occurs within both the first list of affected inodes and a second list of affected inodes that are modified by the pending metadata operations; and
dispatch the metadata operation to the second node based upon the dependency indicating that the metadata operation is independent of the pending metadata operations.

14. The non-transitory machine readable medium of claim 13, wherein the instructions cause the machine to:
transition the first node and the second node from an asynchronous replication state to a synchronous replication state.

15. The non-transitory machine readable medium of claim 14, wherein the instructions cause the machine to:
process metadata operations within a metadata log to resolve dependency of the metadata operations with respect to pending metadata operations dispatched to the second node, wherein the metadata operations are logged into the metadata log based upon being executed upon the first node during the transition.

16. The non-transitory machine readable medium of claim 15, wherein a first metadata operation and a second metadata operation are dispatched from the metadata log to the second node in parallel based upon the first metadata operation and the second metadata operation affecting different inodes.

17. The non-transitory machine readable medium of claim 15, wherein dispatch of a first metadata operation from the metadata log is withheld until completion of a pending metadata operation based upon the first metadata operation and the pending metadata operation affecting a same inode.

18. The non-transitory machine readable medium of claim 15, wherein data modified by data operations during the transition are tracked within a dirty region log, and wherein the instructions cause the machine to:
perform atomic data operations to read modified data tracked by the dirty region log and write the modified data to the second node during a data scan phase, wherein incoming metadata operations are withheld from execution upon the first node until completion of the data scan phase.

19. The non-transitory machine readable medium of claim 18, wherein an atomic data operation is withheld from execution until pending metadata operations affecting overlapping inodes complete.

20. A computing device comprising:
a memory comprising machine executable code for performing a method; and
a processor coupled to the memory, the processor configured to execute the machine executable code to cause the processor to:
track a count of pending data operations being executed by a first node and replicated to a second node based upon a synchronous replication relationship where data operations are dispatched in parallel to the first node and the second node, wherein a first count for a first pending data operation is decremented in response to both a first pending data operation being executed by the first node and a replica of the first pending data operation being executed by the second node;
while the count of pending data operations being executed by the first node and replicated to the second node is greater than zero, withhold execution of metadata operations at the first node;

execute a metadata operation at the first node in response to a determination that the count is equal to zero, wherein, as a result of the execution of the metadata operation a first list of affected inodes modified by the metadata operation are identified;

determine dependency of the metadata operation with respect to pending metadata operations replicated to the second node based upon whether an inode occurs within both the first list of affected inodes and a second list of affected inodes that are modified by the pending metadata operations; and dispatch the metadata operation to the second node based upon the dependency indicating that the metadata operation is independent of the pending metadata operations.

* * * * *